(12) United States Patent
Cohen et al.

(10) Patent No.: US 7,817,087 B2
(45) Date of Patent: Oct. 19, 2010

(54) METHOD AND APPARATUS FOR RELATIVE NAVIGATION USING REFLECTED GPS SIGNALS

(75) Inventors: Ian R. Cohen, Eldersburg, MD (US); Gregory J. Boegner, Jr., White Hall, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/116,518

(22) Filed: May 7, 2008

(65) Prior Publication Data

US 2009/0278736 A1 Nov. 12, 2009

(51) Int. Cl.
*G01S 19/42* (2010.01)
*G01S 19/51* (2010.01)

(52) U.S. Cl. .............................. 342/357.25; 342/357.34

(58) Field of Classification Search ................. 342/353, 342/357.06, 357.08, 357.13, 357.15, 357.16; 455/12.1, 13.1, 13.3; 701/213, 215
See application file for complete search history.

(56) References Cited

U.S. PATENT DOCUMENTS

| 6,653,972 B1 | 11/2003 | Krikorian et al. |
| 2005/0192719 A1* | 9/2005 | Sheikh et al. .................. 701/13 |
| 2006/0077094 A1 | 4/2006 | Eisenstein |
| 2006/0082496 A1 | 4/2006 | Winternitz et al. |

\* cited by examiner

*Primary Examiner*—Dao L Phan
(74) *Attorney, Agent, or Firm*—Matthew F. Johnston (57) ABSTRACT

A method and system to passively navigate an orbiting moving body towards an orbiting target using reflected GPS signals. A pair of antennas is employed to receive both direct signals from a plurality of GPS satellites and a second antenna to receive GPS signals reflected off an orbiting target. The direct and reflected signals are processed and compared to determine the relative distance and position of the orbiting moving body relative to the orbiting target.

17 Claims, 5 Drawing Sheets

METHOD AND APPARATUS FOR RELATIVE NAVIGATION USING REFLECTED GPS SIGNALS

GOVERNMENT INTEREST

The embodiments of the invention described herein were made by employees of the United States Government, and may be manufactured and used by or for the United States Government for governmental purposes without payment of any royalties thereon or therefor.

BACKGROUND OF THE INVENTION

1. Field of the Invention

The present invention relates to navigating a moving body with the use of GPS signals and more particularly to the use of reflected GPS signals to passively navigate an orbiting body towards an orbiting target.

2. Description of the Related Art

Spacecraft require equipment that calculates the orbital position, velocity, time, and attitude. The advent of the Global Positioning System ("GPS"), increased the desirability of using onboard processing systems for spacecraft position determination.

The GPS satellite system is a collection of satellites that can be used for missile, satellite, aircraft, and terrestrial navigation. Each GPS satellite broadcasts its own ephemeris and time, thereby allowing a GPS receiver to determine its position. Typically, a GPS receiver calculates its position from the simultaneous observation of any four GPS satellites in order to calculate its position. A civil grade GPS receiver can accurately determine its position within 20 meters, determine its velocity within 0.6 meters/second, and the current time with a 10-nanosecond accuracy. At least twenty-four valid GPS satellites are in the GPS constellation at any given time.

A GPS receiver is an autonomous instrument that transforms signals from GPS satellites into point solutions for spacecraft navigation. Current GPS receivers have a radio frequency section for receiving and converting signals received from a spacecraft's antennas. The digitized signals are then forwarded to one or more correlators, controlled by the receivers own processor. The correlators look for matches between the incoming signal and the C/A code for different satellites. When a satellite lock occurs, or the incoming signal matches an internally generated pseudo random noise (PRN) code, the receiver's processor is notified. The processor contains executable code to generate a pseudo-range or a line-of-sight distance to the satellite. The processor may also contain the executable code of an orbit propagator. The pseudo-range is a measurement input to the navigation filter that calculates point solutions for determining the orbit of the spacecraft. While such GPS systems may be employed to position and track an orbiting moving body such as the Space Shuttle, such systems do not provide the ability to determine the position relative to another orbiting body. Conventional GPS receivers can not passively provide relative navigation or relative position data which are necessary during formation flying, docking, or other approach of space craft to proximity to another orbiting body.

The space environment poses additional obstacles to that of land based tracking systems. Because of the speeds associated with spacecraft motion, GPS satellites are in view for much shorter time periods than when viewed from a ground reference. The appearance and disappearance of GPS satellites from view causes their output signals to slew through the entire range of the 45-kilohertz Doppler shift. Typical spacecraft formation flying and autonomous rendezvous missions rely on active transmissions schemes such as RADAR (RAdio Detection and Ranging) and LIDAR (Light Detection and Ranging) which require specialized hardware requiring additional mass and power consumption. With the extreme weight and power restraints associated with space flight, there is a particular need for a reliable navigation/positioning system which reduces weight and power consumption requirements, as well as taking advantage of free GPS signals.

The use of Reflected GPS signals per se is also known. U.S. patent application publication 2006/0077094 entitled Information "Information Gathering Using reflected Signals" discloses a method of using reflected signals in a land based application to monitor the presence or absence of an object such as if a vehicle occupies a parking space and is hereby incorporated herein in its entirely. This system is not only ill suited for orbital applications, but does not make use of the reflected signal to navigate to a target.

It is also known to use Bistatic Radar Systems where a radar transmitter located remotely from the projectile (such as onboard a ship) illuminates the target and the reflected returns are received by a receiver located on the projectile. The tracking data from the radar measurements are then used to calculate the proper guidance signals to direct the projectile to the target. An example of a bistatic radar system is discloses ill U.S. Pat. No. 6,653,972 which in incorporated herein it is entirely. These systems require the use and control of an active radar transmitter and do not provide a suitable global positioning function. Rather, these systems are employed to simply acquire and hone in on a particular target. Therefore, such Bistatic radar systems are not suited for orbital positioning and navigation or have the ability to rely on a passive autonomous system.

One of the objects of the present invention is to utilize reflected GPS signals to provide passive autonomous relative navigation of an orbiting spacecraft towards an orbiting body.

SUMMARY OF THE INVENTION

The present invention is directed to a method and system to passively navigate an orbiting moving body towards an orbiting target using reflected GPS signals. A pair of receive antennae are employed. One to receive direct signals from a plurality of GPS satellites and a second antenna to receive GPS signals reflected off an orbiting target. The direct and reflected signals are processed and compared to determine the relative distance and position of the orbiting moving body relative to the orbiting target.

DETAILED DESCRIPTION OF A PREFERRED EMBODIMENT

A preferred embodiment of the invention and the various features and advantageous details thereof are explained more fully with reference to the accompanying drawings and detailed in the following description. It should be noted that the features illustrated in the drawings are not necessarily drawn to scale and descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Figure 1:
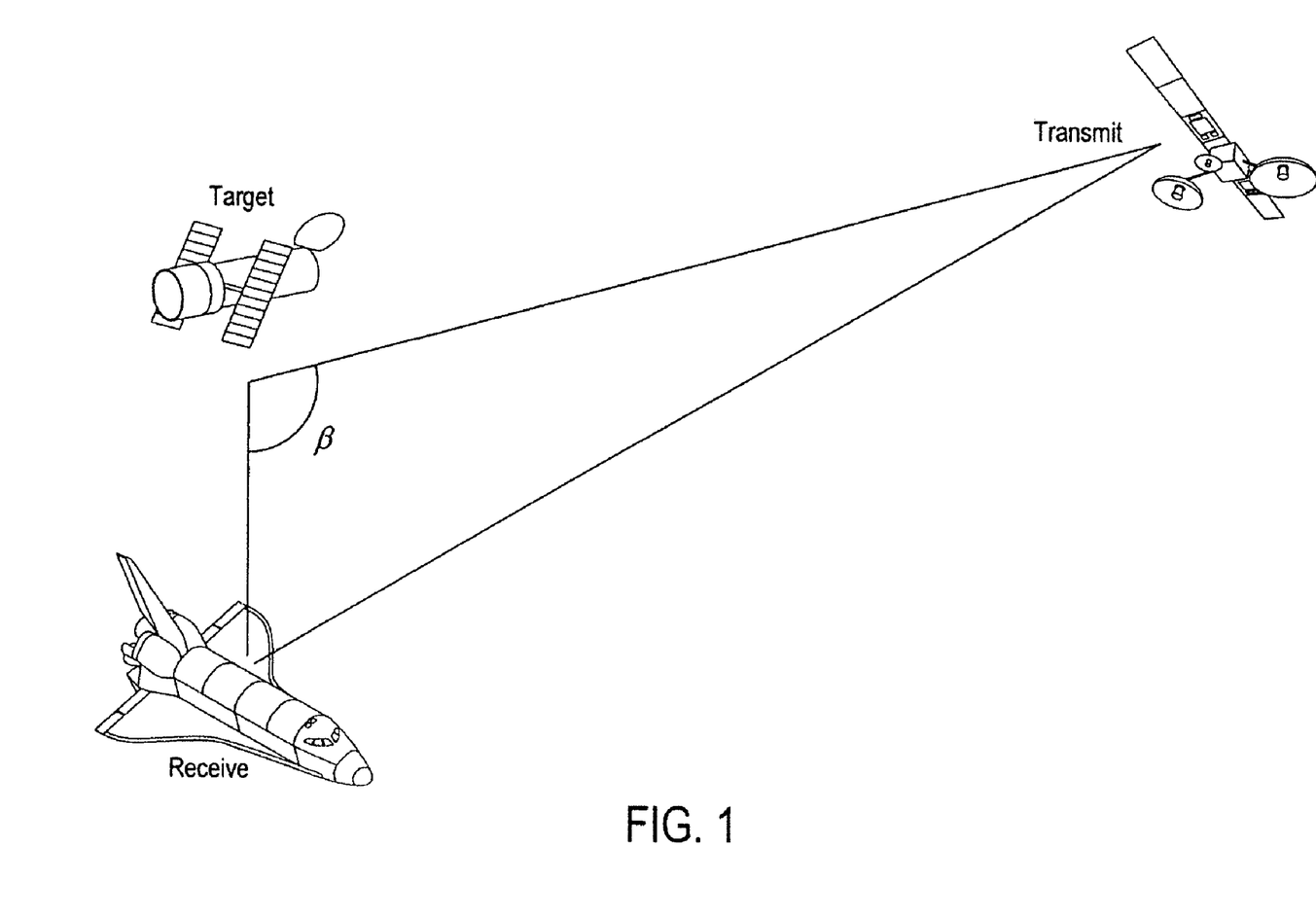
FIG. 1 is a diagram depicting the relative geometry between an orbiting spacecraft, target and satellite.

The present invention is directed to a method and apparatus for passively navigating an orbiting space craft towards and orbiting target using reflected GPS signal. FIG. 1 depicts the relative geometry between the space shuttle, Hubble space telescope and a GPS satellite. By comparing both signals received directed from the GPS satellite and signals reflected off the Hubble, a navigation system employed on the space shuttle can passively and autonomous determine its position relative to the Hubble thereby providing navigational aid passively and autonomously. Acquisition of and tracking of GPS signals are well known in the art and need not be discussed in detail. U.S. published patent application US 2006-0082496 to Winternitz et al. discloses a radiation-hardened fast acquisition/weak signal tracking system and method and is hereby incorporated herein by referenced in its entirety.

The actual GPS measurements recorded from any of the constellation of satellites are the pseudorange and psuedorange rate. The pseudorange, $\rho$, is based on the time of flight between the GPS receiver and the GPS transmit antenna. This is used to form a range measurement, and thus solve for a position fix when enough satellites are available. The other measurement available is pseudorange rate that is essentially the rate of change along the line of sight vector to the satellite. The pseudorange rate, dot$\rho$, can also be viewed as the Doppler shift on the signal. The pseudorange rate equation is equivalent to the carrier rate, $\Phi$ which tends to be a less noisy measurement.

The measured pseudorange is the difference between the system time at which the signal left the GPS satellite and the system time at which the signal reached the user. This is given by $$\rho = r + c(t_u + \delta t + \delta t_D)$$

r is the geometric range is given by $r=c(T_u-T_s)$, which is the exact time of flight between the user and the GPS satellite. $t_u$ is the receiver offset from system time, $\delta_t$ is the offset of the satellite from system time, and $\delta_{tD}$ is due to other measurement errors.

The GPS constellation is segmented into 3 parts, the user, the control, and space segment. The three main sources for the space segment are satellite clock stability, clock perturbations, and selective availability. For the control segment, it's primarily ephemeris prediction error. For the user segment it is ionospheric delay, multipath, receiver noise, and resolution.

The GPS satellite clock error is the residual error from a second order polynomial fit, adjusting for relativistic effects, the clock bias, clock drift, and frequency drift. The Satellite Clock error is on the order of 3.0 m. The satellite ephemeris error is caused from the deviation in the current satellite ephemeride stored onboard the GPS satellite with the satellite's true position. These ephemeris values are used to form the line of sight vectors from each SV to the user, thus each perturbation adds error into the pseudorange. This is normally on the order of 4.2 m for a typical ground based GPS receiver.

The GPS system also experiences relativistic effects due to the gravitational potential differences. Space users also experience ionospheric effects. This is generally seen as a bias in the measurement. The ionospheric effect is modeled off of the path length of the signal traveled through the ionosphere. There are also measurement errors from within the receiver. These are from the tracking loops internal to the GPS receiver. The dominant sources of error introduced here are the thermal noise jitter and dynamic stress error. The secondary sources are given by the hardware and software resolution, and clock drift. The last sources are multipath and shadowing effects. For the purposes of rendezvous, we are actually interested in tracking these multipath sources in order to solve for a relative position. The GPS pseudorange error budget is on the order of 8.0 m for a standard GPS receiver located on the ground.

The direct pseudorange rate is a measurement of the rate of change of the psuedorange between the user and the GPS satellite. It is given by $$\dot{\rho} = (V_u - V_a) \cdot \hat{los} + \epsilon$$

That is the rate of change of the psuedorange along the line of sight vector and the user. The error is mainly determined by the clock drift component. Generally these measurements are noisy compared to that of the pseudorange.

The constructed measurements for the bistatic ranging problem are the differenced reflected psuedorange and the reflected psuedorange rate. The reflected psuedorange, $\rho_R$ is differenced with the direct signal psuedorange to remove the common mode errors from the measurement. Some of the common mode errors removed are front-end jitter, receiver bias, thermal noise, and line bias, leaving us primarily with ionospheric effects, multipath and jitter error contributions. The psuedorange rate is the additive Doppler shifts along the line of sight vectors between Hubble and the Shuttle, and between Hubble and the GPS constellation.

This difference reflected psuedorange measurement is constructed from the difference in the direct path signal and the reflected signal. The equation is given by:

$$\rho_{pr} = \rho_R - \rho_D$$

Expressing as a geometric relation we arrive at:

$$\rho_{pr} = r_{sh} + r_{hg} - r_{gs} + \epsilon$$

That is the sum of the geometric range from the Shuttle to Hubble, Hubble to the GPS satellite, and the Shuttle to the GPS satellite, plus the residual errors.

The psuedorange rate can be seen as a Doppler shift on the signal. The reflection can be viewed as a retransmission, making it an additive process.

$$\dot{\rho}_r = (V_s - V_h)\hat{los}_{sh} + (V_h - V_g)\hat{los}_{hg}$$

Where the $\hat{los}_{sh}$ is the line of sight vector between the Shuttle and Hubble, and $\hat{los}_{sh}$ is the line of sight between Hubble and a GPS satellite. The primary sources of error contributing to the reflected psuedorange rate are the same of that as the direct measurement, however, the quality of the incoming signal is degraded due to the reflective process and the actual effect is unknown.

Typical GPS receivers use a simple least squares algorithm to determine position and time. It requires at least 4 visible satellites to solve for the four unknowns x,y,z, and the user clock offset from the GPS constellation. In addition to position estimates, some also do perform a finite difference of the positions to solve for velocity as well.

In more advanced receivers, a Kalman filter may be implemented in order to utilize the dynamic information, as well as the measurements to improve the accuracy of the receiver. On orbit, the GPS receiver will experience large dynamic stress and motion with respect to the GPS satellites, it is almost necessary to filter this heavily to provide a good navigation solution. The method of the present invention implements an extended Kalman filter which will now be described.

The Kalman filter represents an optimal filter for a linear system with additive gaussian noise with zero mean. Since the dynamics of an orbiting body are well understood and their equations are well formulated, it is possible to exploit that information when forming the Kalman filter when applied to the relative navigation problem. The canonical form of the Kalman filter is the optimal filter for a linear system, incorporating a blending of known dynamics, with that of the measurements. The discrete Kalman filter can be broken up into two distinct steps, the time update and measurement update.

The dynamical equations in a standard linear system are in the form:

$$\dot{X} = Ax + Bu + d$$

$$y = Hx + n$$

These equations are continuous and need to be discretized in order to implement them in the Kalman filter.

This discretization is given by:

$$x_{k+1} = \Phi_k x + \Gamma_k u_k + d_k$$

$$y_k = Hx_k + n_k$$

This relates timestep k−1, to timestep k. In order to calculate the state evolution between timesteps, for a linear system, the state transition matrix Φ is given by:

$$\Phi_k = e^{A\Delta T}$$

Where $$\Delta T = t_{k+1} - t_k.$$

The evolution of Γ is a bit more complex, it is given by:

$$\Gamma_k = \int_0^T e^{A\Delta \tau} Bu(\tau) d\tau$$

This model only concerns the unforced dynamics, so without loss of generality, B is assigned 0 and Γ is dropped. Now these equations can be applied to the Kalman filter form.

The first step in the Kalman filter is to propagate the measurement from time-step k to the time-step k+1. This is done by multiplying by the state transition matrix, or integrating from $$t_k \text{ to } t_{k+1}.$$

$$\hat{x}_{k+1}^- = \Phi_k \hat{x}_k + \Gamma_k u_k$$

Propagating the error covariance matrix.
P is defined as $$P = E[(\hat{x}-x)(\hat{x}-x)^T]$$

it represents the variance in the estimator errors.

The error covariance propagation step is given as follows:

$$P_{k+1}^- = \Phi_k P_k \Phi_k^T + Q$$

The first step of the measurement update is to form the Kalman Gain, $K_K$. The Kalman gain is the optimal estimate to minimize the errors along the diagonal of the covariance matrix.

$$K_k = P_k^- H_k^T (H_k P_k^{-31} H_k^T + R)^{-1}$$

The next step is to apply the gain to the measurement error. The H matrix is the measurement connection matrix, it connects the states with the measurement at time-step k.

$$\hat{x}_{k=xk}^- + K_k(z_k - H_k \hat{x}_k^-)$$

The final step is to correct the error covariance for time-step k.

$$P_k = (I - K_k H) P_k^-$$

While die equations are relatively straight forward in the discrete Kalman filter, they require a measurement model and the plant dynamics are linear systems. Unfortunately, in the real world most systems are nonlinear. In particular, GPS has a non-linear measurement model.

The solution to a nonlinear measurement model can be done by approximating $Y_K$. Given a nonlinear measurement model Y=h(x)

$$y_k = H_k x_k$$

$$H_k = \frac{\partial h}{\partial x}\bigg|_{\hat{x}_k}$$

This approximation is called an extended Kalman filter.

The last two parts of a Kalman filter are the measurement covariance, and process noise matrices, R and Q respectively. The measurement covariance matrix consists of the variance of noise on the signal. From the canonical form:

$$y_k = H_k x_k + n_k$$

it can be shown that $$R = E[n_k n_k^T]$$

Assuming uncorrelated gaussian white noise with zero mean, R is given by:

$$R = \begin{bmatrix} \sigma_\rho^2 I_{nxn} & 0_{nxn} \\ 0_{nxn} & \sigma_{\dot{\rho}}^2 I_{nxn} \end{bmatrix}$$

The process noise matrix is given by the variance unmodeled forces in the dynamic model. Assuming we have a model:

$$x_k = \Phi_k x_k + \Gamma_k u_k + d_k$$

noise actually enters the system as a disturbance on the input.

$$Q = \Gamma_k E[d_k d_k^T] \Gamma_k^T$$

Unfortunately, the equation to describe the matrix Q is difficult to obtain because it requires calculation of Γ. In the simulations, Q is treated as a free variable, adjusting it to give the optimal performance, and reduce the process covariance bounds such that they were roughly equal to the measured variance in R.

In the case of relative navigation, it is an essential to be able to solve for your relative position as well as possible. One of the best ways is to improve your solution is to have an accurate dynamic model. This way, one can rely on the dynamic model to propagate through measurement outages and noisy measurements. This is especially true in the case of applying reflected GPS measurements.

Defining the necessary components to construct the filter is necessary before beginning formulation of the Kalman filters for the relative navigation problem. Given a dynamical system:

$$\dot{x} = f(x)$$

$$y = h(x)$$

It is thus necessary to define a state vector, X. The state vectors used in an absolute model, are the absolute positions and velocities of the Shuttle and HST, as well as the bias state for the navigation solution. Typically a GPS receiver would include the bias drift as another component. For this simulation, since the rendezvous is over a short period of time, bias drift can be neglected.

$$x = [r_s, v_s, r_h, v_h, b]^T$$

For a completely relative model, Hill's equations are used to propagate the states. This requires formulating the problem entirely in a relative frame. The states in this case are:

$$X = [\Delta_r, \Delta_v]^T$$

In this formulation, $\Delta_r$ is the relative position in hill's frame and $\Delta_v$ is the velocity. Typically the dynamic model is a nonlinear equation given by a $f(\text{dot}) = f(x)$. In this analysis two different model are examined. The first model is based purely on the 2 body equation of motion given by Hill's equations. This model is a linearized representation of the relative spacecraft dynamics and has the form $$\dot{x} = Ax.$$

where A is given by the partials of f(x) evaluated along a reference trajectory.

$$A = \frac{\partial f}{\partial x}\bigg|_{\hat{x}_k}$$

Hill's model is conveniently linear, simplifying the application of the Kalman filter. Hill's model is only valid for close proximity maneuvers and requires a special coordinate frame to operate in, centered on a circular orbit for one of the vehicles.

Figure 2:
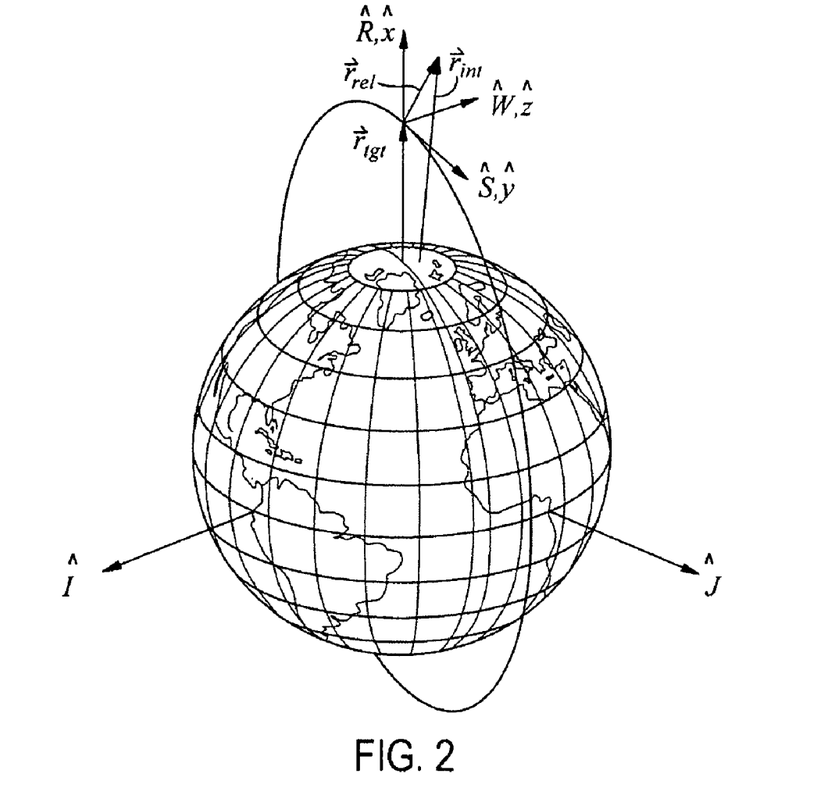
FIGS. 2-3 are diagrams depicting the earth centered inertial coordinate frame.

Hill's equations of motion are derived in the $\hat{R}$, $\hat{S}$, $\hat{W}$ coordinate frame as depicted in FIG. 2.

$\hat{R}$ is the radial direction from the center of the earth, $\hat{S}$ is the projection of the velocity in the plane perpendicular to $\hat{R}$, and $\hat{W}$ is the direction of angular momentum perpendicular to the orbital plane.

The transformations from the IJK coordinate frame are as follows:

$$\hat{R} = \frac{R}{|R|}$$

$$\hat{S} = \hat{W} \times \hat{R}$$

$$\hat{W} = \frac{\hat{R} \times \dot{\hat{R}}}{|\hat{R} \times \dot{\hat{R}}|}$$

Where r and $\dot{r}$ are the position and velocity vectors in the IJK reference frame. Since Hill's frame is a relative frame, typically one spacecraft is chosen to be the reference orbit. This orbit is ideally circular. In this case, the orbit chosen is the space shuttle. This is denoted by $r_{tgt}$, the other spacecraft is typically called the interceptor or $r_{int}$. Hill's equations, also known as the Clohessy Wiltshire equations which are the governing forces for relative two-body motion. These equations are well known and have an explicit solution.

$$\ddot{x} - 2w\dot{y} - 3w^2x + fx = 0$$

$$\ddot{y} + 2w\dot{x} + fy = 0$$

$$\ddot{z} + w^2z + fz = 0$$

or, by defining
$x^T = (x, \dot{x})$, then provides the form $\dot{x} = f(x)$. Now, taking partials with respect to the states, arriving at the canonical linear system form $\dot{x} = Ax$.

$$\dot{x} = \begin{bmatrix} 0 & 0 & 0 & 1 & 0 & 0 \\ 0 & 0 & 0 & 0 & 1 & 0 \\ 0 & 0 & 0 & 0 & 0 & 1 \\ 3\omega^2 & 0 & 0 & 0 & 2\omega & 0 \\ 0 & 0 & 0 & -2\omega & 0 & 0 \\ 0 & 0 & \omega^2 & 0 & 0 & 0 \end{bmatrix} x + \begin{bmatrix} 0 & 0 & 0 \\ 0 & 0 & 0 \\ 0 & 0 & 0 \\ 1 & 0 & 0 \\ 0 & 1 & 0 \\ 0 & 0 & 1 \end{bmatrix} u$$

Hill's equations being in a linear form fit well into the linear systems toolset. If we assume a constant A over each discrete time step we can approximate:

$$\Phi(t_{k+1}, t_k) = e^{(A\Delta t)}$$

$$A = \frac{\partial f}{\partial x}\bigg|_{\hat{x}_k}$$

This formulation provides a state transition matrix in linear form that can be easily applied to both the state propagation steps and the covariance propagation. Although the relative dynamics are minimal in comparison between spacecraft, their actual perturbations on the dynamics are quite significant in low earth orbit. In addition to increasing the fidelity of the dynamic model, it allows customization of the orbits and adds other effects such as thruster firing, and differences in their drag coefficients.

Figure 3:
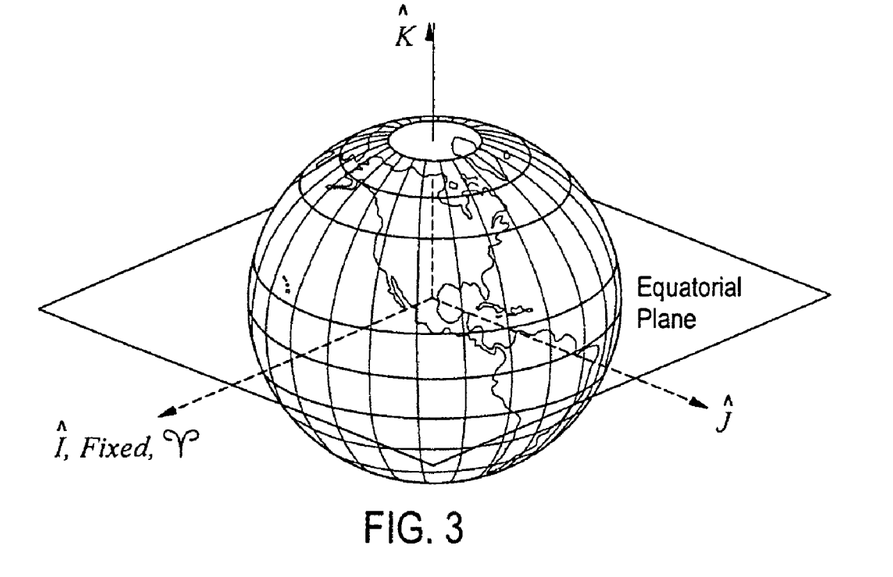

The coordinate frame used in the high fidelity dynamic model is the Earth Centered Inertial frame. This reference frame was chosen because it greatly simplifies the equations of motion. The ECI coordinate system is also known as the IJK system. Referring to FIG. 3 the $\hat{I}$ axis is pointed towards the vernal equinox, the $\hat{J}$ axis is 90° to the east along the equatorial plane, and the $\hat{K}$ axis extends through the North Pole.

The full nonlinear dynamic equations are given by:

$$\ddot{r}_x = -\frac{\mu x}{r^3}\left[1 - \frac{3}{2}J_2\left(\frac{R_E}{r}\right)^2\left(\frac{5z^2}{2r^2} - 1\right)\right] - \frac{1}{2}C_D\frac{A}{m}\rho V(\dot{x} + \omega_E y)$$

$$\ddot{r}_y = -\frac{\mu y}{r^3}\left[1 - \frac{3}{2}J_2\left(\frac{R_E}{r}\right)^2\left(\frac{5z^2}{2r^2} - 1\right)\right] - \frac{1}{2}C_D\frac{A}{m}\rho V(\dot{y} + \omega_E x)$$

$$\ddot{r}_z = -\frac{\mu z}{r^3}\left[1 - \frac{3}{2}J_2\left(\frac{R_E}{r}\right)^2\left(\frac{5z^2}{2r^2} - 3\right)\right] - \frac{1}{2}C_D\frac{A}{m}\rho V\dot{z}$$

The $J_2$ term is the zonal harmonic constant given by $1082.7 \times 10^{-6}$. $\omega_E$ is the rotation rate of the earth, $R_E$ is the radius of the earth, m is the objects mass, A is the cross sectional area, and V is the relative wind. The relative wind is given by the equation $$V = \sqrt{\dot{r}_x^2 + 2\omega_E \dot{r}_x r_y + \dot{r}_y^2 - 2\omega_E \dot{r}_y r_x + \omega_E^2 r_y^2 + \dot{r}_z^2}$$

The value of $\rho$ is given by an exponential model derived in:

$$\rho = \rho_0 e^{(-a-a_o)/H}$$

Where $\rho_0 = 3.275\text{e}-12$ kg/m$^3$, a is the current altitude, $a_0$ is the reference altitude, 400000 m and H is the scaling height 58515 m. Using the same from the simple GPS Kalman filter, choosing r as position and v as velocity, the equations it is now appropriate to write these equations in terms of first order derivatives, to fit the canonical form, are $$\dot{r} = v \text{ and } \dot{v} = g(r,v)$$

In this formulation, g is the nonlinear force model for the orbital dynamics. Now, let the state vector $x = [r, v]^T$.

$$\dot{x} = [v, g(r,v)]^T$$

or $$f(x) = \begin{bmatrix} v_x \\ v_y \\ v_z \\ \ddot{r}_x \\ \ddot{r}_y \\ \ddot{r}_z \end{bmatrix}$$

The equations are in the appropriate form to apply the Kalman Filter. Since the Kalman filter's covariance propagation is a linear process, it is necessary to formulate the partial derivatives with respect to the state vector. Although the partials are not used to propagate the dynamics, they are needed when forming the state transition matrix for the covariance updates.

$$\frac{\partial \dot{r}_x}{\partial \dot{x}} = 1 \quad \frac{\partial \dot{r}_y}{\partial \dot{y}} = 1 \quad \frac{\partial \dot{r}_z}{\partial \dot{z}} = 1$$

$$\frac{\partial \ddot{r}_x}{\partial x} = -\frac{\mu}{r^3}\left[1 - \frac{3}{2}J_2\left(\frac{R_E}{r}\right)^2\left(5\frac{z^2}{r^2} - 1\right)\right] + 3\frac{\mu x^2}{r^5}\left[1 - \frac{5}{2}J_2\left(\frac{R_E}{r}\right)^2\left(7\frac{z^2}{r^2} - 1\right)\right] +$$

$$\frac{1}{2}C_D \frac{A}{m}\rho V \frac{x(\dot{x} + \omega_E y)}{rH} + \frac{1}{2}C_D \frac{A}{m}\rho V \frac{x(\dot{x} + \omega_E y)(\dot{y} - \omega_E x)}{V}$$

$$\frac{\partial \ddot{r}_x}{\partial y} = 3\frac{\mu xy}{r^5}\left[1 - \frac{5}{2}J_2\left(\frac{R_E}{r}\right)^2\left(7\frac{z^2}{r^2} - 1\right)\right] + \frac{1}{2}C_D \frac{A}{m}\rho V \frac{y(\dot{x} + \omega_E y)}{rH} -$$

$$\frac{1}{2}C_D \frac{A}{m}\rho\left[V\omega_E + \frac{\omega_E(\dot{x} + \omega_E y)^2}{V}\right]$$

$$\frac{\partial \ddot{r}_x}{\partial z} = 3\frac{\mu xz}{r^5}\left[1 - \frac{5}{2}J_2\left(\frac{R_E}{r}\right)^2\left(7\frac{z^2}{r^2} - 1\right)\right] + \frac{1}{2}C_D \frac{A}{m}\rho V \frac{z(\dot{x} + \omega_E y)}{rH}$$

$$\frac{\partial \ddot{r}_x}{\partial \dot{x}} = -\frac{1}{2}C_D \frac{A}{m}\rho\left[V + \frac{(\dot{x} + \omega_E y)^2}{V}\right]$$

$$\frac{\partial \ddot{r}_x}{\partial \dot{y}} = -\frac{1}{2}C_D \frac{A}{m}\rho \frac{(\dot{y} - \omega_E x)(\dot{x} - \omega_E y)}{V}$$

$$\frac{\partial \ddot{r}_x}{\partial \dot{z}} = -\frac{1}{2}C_D \frac{A}{m}\rho \frac{\dot{z}(\dot{x} + \omega_E y)}{V}$$

-continued $$\frac{\partial \ddot{r}_y}{\partial x} = 3\frac{\mu xy}{r^5}\left[1 - \frac{5}{2}J_2\left(\frac{R_E}{r}\right)^2\left(7\frac{z^2}{r^2} - 1\right)\right] +$$

$$\frac{1}{2}C_D \frac{A}{m}\rho V \frac{x(\dot{y} + \omega_E x)}{rH} - \frac{1}{2}C_D \frac{A}{m}\rho\left[V\omega_E + \frac{\omega_E(\dot{y} + \omega_E y)^2}{V}\right]$$

$$\frac{\partial \ddot{r}_y}{\partial y} = -\frac{\mu}{r^3}\left[1 - \frac{3}{2}J_2\left(\frac{R_E}{r}\right)^2\left(5\frac{z^2}{r^2} - 1\right)\right] + 3\frac{\mu y^2}{r^5}\left[1 - \frac{5}{2}J_2\left(\frac{R_E}{r}\right)^2\left(7\frac{z^2}{r^2} - 1\right)\right] +$$

$$\frac{1}{2}C_D \frac{A}{m}\rho V \frac{y(\dot{y} + \omega_E x)}{rH} + \frac{1}{2}C_D \frac{A}{m}\rho \frac{\omega_E(\dot{y} + \omega_E x)(\dot{x} - \omega_E y)}{V}$$

$$\frac{\partial \ddot{r}_y}{\partial z} = 3\frac{\mu xz}{r^5}\left[1 - \frac{5}{2}J_2\left(\frac{R_E}{r}\right)^2\left(7\frac{z^2}{r^2} - 1\right)\right] + \frac{1}{2}C_D \frac{A}{m}\rho V \frac{z(\dot{y} + \omega_E y)}{rH}$$

$$\frac{\partial \ddot{r}_y}{\partial \dot{x}} = -\frac{1}{2}C_D \frac{A}{m}\rho \frac{(\dot{y} - \omega_E x)(\dot{x} - \omega_E y)}{V}$$

$$\frac{\partial \ddot{r}_y}{\partial \dot{y}} = -\frac{1}{2}C_D \frac{A}{m}\rho\left[V + \frac{(\dot{y} + \omega_E x)^2}{V}\right]$$

$$\frac{\partial \ddot{r}_y}{\partial \dot{z}} = -\frac{1}{2}C_D \frac{A}{m}\rho \frac{\dot{z}(\dot{y} + \omega_E z)}{V}$$

$$\frac{\partial \ddot{r}_z}{\partial x} = 3\frac{\mu xz}{r^5}\left[1 - \frac{5}{2}J_2\left(\frac{R_E}{r}\right)^2\left(7\frac{z^2}{r^2} - 3\right)\right] +$$

$$\frac{1}{2}C_D \frac{A}{m}\rho V \frac{\dot{z}x}{rH} - \frac{1}{2}C_D \frac{A}{m}\rho \frac{\omega_E \dot{z}(\dot{y} + \omega_E x)}{V}$$

$$\frac{\partial \ddot{r}_z}{\partial z} = 3\frac{\mu yz}{r^5}\left[1 - \frac{5}{2}J_2\left(\frac{R_E}{r}\right)^2\left(7\frac{z^2}{r^2} - 3\right)\right] +$$

$$\frac{1}{2}C_D \frac{A}{m}\rho V \frac{\dot{z}y}{rH} - \frac{1}{2}C_D \frac{A}{m}\rho\left(\frac{\omega_E \dot{z}(\dot{x} - \omega_E y)}{V}\right)$$

$$\frac{\partial \ddot{r}_z}{\partial z} = -\frac{\mu}{r^3}\left[1 - \frac{3}{2}J_2\left(\frac{R_E}{r}\right)^2\left(5\frac{z^2}{r^2} - 3\right)\right] +$$

$$3\frac{\mu y^2}{r^5}\left[1 - \frac{5}{2}J_2\left(\frac{R_E}{r}\right)^2\left(7\frac{z^2}{r^2} - 5\right)\right] + \frac{1}{2}C_D \frac{A}{m}\rho V \frac{z\dot{z}}{rH}$$

$$\frac{\partial \ddot{r}_z}{\partial \dot{x}} = -\frac{1}{2}C_D \frac{A}{m}\rho \frac{\dot{z}(\dot{x} + \omega_E y)}{V}$$

$$\frac{\partial \ddot{r}_z}{\partial \dot{y}} = -\frac{1}{2}C_D \frac{A}{m}\rho \frac{\dot{z}(\dot{y} + \omega_E x)}{V}$$

$$\frac{\partial \ddot{r}_z}{\partial \dot{z}} = -\frac{1}{2}C_D \frac{A}{m}\rho\left(V + \frac{\dot{x}^2}{V}\right)$$

Hill's equations of motions are conveniently in linear form: $x_{(dot)} = A_x + B_u$. The state transition matrix can simply be approximated by the matrix exponential $$e^{A\Delta T}.$$

Where A is the linear system A matrix, and T is the time interval. In this particular implementation the time step is on the order of 1 second, thus T=1 This is both used in the dynamics, and the covariance propagation. In the full nonlinear case estimates would diverge after a few iterations using a first order approximation of the system. Thus the state is integrated over time steps of one second. The covariance matrices are propagated linearly, using, $$P_{k+1} = \Phi(t_{k+1}, t_k) P_k \Phi(t_{k+1}, t_k)^T + Q.$$

Solving for $\Phi$ in a given linear system, we have:

$$\dot{\Phi}(t_{k+1}, t_k) = A(t_k)\Phi(t_k)$$

$$\Phi(t_{k+1}, t_k) = \int_{t_k}^{t_{k+1}} A(\tau)\Phi d\tau$$

and arrive at an approximate $$\Phi(t_{k-1}, t_k).$$

Since A is not constant over the time interval $t_{k+1}$, $t_k$, we cannot rely on the matrix exponential approximation for this integration.

In order to incorporate the variation of the states between time steps, the added dynamic equation $\dot{\Phi}=A\Phi$ is included within the dynamic model propagation. This allows integrating the dynamics and solving for $\phi$ between time steps, while varying A with the current state estimates. In order to solve for $\phi$, the initial condition vector of the states and the identity reshaped into a vector is required. The resultant $\phi$ at the end of the integration is then used in the linear propagation of P.

Implementing the filter with Hill's model is fairly straightforward. Since Hill's model is in the relative frame, the shuttle's position is implicitly included in the states, any parameters derived from the position, can be assumed to be provided by the GPS receiver's navigation solution.

The equation describing the reflected Pseudorange Measurement is given by:

$$h(X) = \rho_r = r_{sh} + r_{hg} - r_{gs}$$

The subscripts stand as the Shuttle to Hubble, Hubble to a GPS satellite, and A GPS satellite to the Shuttle respectively. The GPS satellites position is known from the ephemeredes, and Shuttle's position is known from the receiver's navigation solution. If we define, $\Delta_r = X_s - X_h$, that is the relative position between the Hubble and Shuttle and rotate into Hill's frame we arrive at:

$$\rho_r = |\Delta_r| + |\Delta_r - X_g| - |X_g|$$

$\Delta_r$ is our relative position vector to Hubble in the ECI frame, and part of the state vector. Now taking partials with respect to $\Delta_r$ we arrive at:

$$\frac{\partial \rho_r}{\partial \Delta_r} = \frac{\Delta_r}{|\Delta_r|} + \frac{\Delta_r - X_g}{|\Delta_r - X_g|}$$

$$\frac{\partial \rho_r}{\partial \dot{\Delta}_r} = 0$$

This forms our measurement vector:

$$H(x) = \begin{bmatrix} \frac{\partial \rho_r}{\partial \Delta_r {1x3}} & 0_{1x3} \end{bmatrix}$$

The equation describing the reflected pseudorange rate measurement is given by:

$$h_{\dot{\rho}r}(x) = \dot{\rho} = (V_s - V_h) \cdot \hat{los}_{sh} + (V_h - V_g) \cdot \hat{los}_{hg}$$

Now, substituting in the line of sight vectors:

$$\dot{\rho}_r = (V_s - V_h) \cdot \frac{X_s - X_h}{|X_s - X_h|} + (V_h - V_g) \cdot \frac{X_h - X_g}{|X_h - X_g|}$$

Now substituting in $\Delta_r = X_s - X_h$, and $\Delta_v = V_s - V_h$:

$$\dot{\rho} = \Delta_v \cdot \frac{\Delta_r}{|\Delta_r|} + (\Delta_v - V_g) \cdot \frac{\Delta_r - X_g}{|\Delta_r - X_g|}$$

Taking the partials with respect to the state $\Delta r$:

$$\frac{\partial \dot{\rho}}{\partial \Delta_r} = \Delta_v \cdot \left( \frac{1}{\Delta_r} - \frac{\Delta_r^2}{|\Delta_r|^3} \right) + (\Delta_v - V_g) \cdot \left( \frac{1}{|\Delta_r - X_g|} + \frac{\Delta_r - X_g}{|\Delta_r - X_g|^3} \right)$$

Now, taking the partials with respect to the state $\Delta v$:

$$\frac{\partial \dot{\rho}}{\partial \Delta_v} = \frac{\Delta_r}{|\Delta_r|} - \frac{\Delta_r - X_g}{|\Delta_r - X_g|}$$

Now to form the H vector:

$$H_{\dot{\rho}r}(x) = \begin{bmatrix} \frac{\partial \dot{\rho}}{\partial \Delta_r} & \frac{\partial \dot{\rho}}{\partial \Delta_v} \end{bmatrix}$$

For the nonlinear full dynamics implementation, measurements are given by the measurement equations as a function of the states of the system, such that $y = h(x)$. In this formulation, there are 4 different measurements, pseudorange, differenced reflected pseudorange, pseudorange rate, and reflected pseudorange rate. In order to use these measurements in our Kalman filter design, we must linearize the measurements in order to form the canonical H matrix.

The direct psuedorange measurement is given by the equation:

$$h_\rho(x) = \rho = r + c(t_u + \delta t + \delta t_D)$$

neglecting the ionospheric, receiver, ephemeris and other errors $(\delta + \delta T_d)$, the measurement can expressed in terms of a range and bias.

$$h_\rho(x) = \rho = r + b = \sqrt{(x_s - x_g)^2 + (y_s - y_g)^2 + (z_s - z_g)^2} + b$$

where b is the receivers time offset (in meters) from the GPS constellation.

$$H_\rho(x) = \frac{\partial \rho}{\partial x}$$

The partial with respect to the Shuttles position:

$$\frac{\partial \rho}{\partial x_s} = \frac{x_s - x_g}{(x_s - x_g)^2 + (y_s - y_g)^2 + (z_s - z_g)^2}$$

let $r_{sg} = \sqrt{(x_s - x_g)^2 + (y_s - y_g)^2 + (z_s - z_g)^2}$

Now taking it with respect to each position vector:

$$\begin{bmatrix} \frac{x_s - x_g}{r_{sg}} & \frac{y_s - y_g}{r_{sg}} & \frac{z_s - z_g}{r_{sg}} \end{bmatrix}$$

The partial with respect to the Shuttle's velocity:

$$\frac{\partial \rho}{\partial v_s} = 0_{1 \times 3}$$

The partial with respect to receiver bias:

$$\frac{\partial \rho}{\partial r_b} = 1$$

The partial with respect to Hubble's position:

$$\frac{\partial \rho}{\partial r_h} = 0_{1 \times 3}$$

The partial with respect to Hubble's velocity:

$$\frac{\partial \rho}{\partial v_h} = 0_{1 \times 3}$$

Now forming a H vector for the direct measurement $$H_\rho(x) = \begin{bmatrix} \frac{\partial \rho}{\partial r_{s1 \times 3}} & 0_{1 \times 3} & 0_{1 \times 3} & 0_{1 \times 3} & 1 \end{bmatrix}$$

The differenced reflected pseudorange provides information about the absolute shuttle and Hubble position states. Its measurement equation is given as follows:

$$h(x) = \rho_r = r_{sh} + r_{hy} - r_{sy}$$

The bias terms difference out, as well as many of the other common mode errors greatly simplifying the calculation and the algebra. The subscripts sh, hg, and gs signify the range from shuttle to Hubble, Hubble to GPS transmitter, and shuttle to GPS transmitter. These are equivalently:

$$r_{sh} = \sqrt{(x_s - x_h)^2 + (y_s - y_h)^2 + (z_s - z_h)^2}$$

$$r_{hg} = \sqrt{(x_h - x_g)^2 + (y_h - y_g)^2 + (z_h - z_g)^2}$$

$$r_{sg} = \sqrt{(x_s - x_g)^2 + (y_s - y_g)^2 + (z_s - z_g)^2}$$

In order to form the H vector equation we must first linearize the measurement equation. The partial with respect to the Shuttle's position:

$$\frac{\partial \rho}{\partial x_s} = \frac{x_s - x_h}{\sqrt{(x_s - x_h)^2 + (y_s - y_h)^2 + (z_s - z_h)^2}} - \frac{x_s - x_g}{\sqrt{(x_s - x_g)^2 + (y_s - y_g)^2 + (z_s - z_g)^2}}$$

substituting in the definitions of the range vectors we get:

$$\frac{\partial \rho}{\partial x_s} = \frac{x_s - x_h}{r_{sh}} - \frac{x_s - x_g}{r_{gs}}$$

Now extrapolating for each of the shuttle position components, we get a 1×3 vector $$H_x = \begin{bmatrix} \frac{x_s - x_h}{r_{sh}} - \frac{x_s - x_g}{r_{gs}} & \frac{x_s - x_h}{r_{sh}} - \frac{x_s - x_g}{r_{gs}} & \frac{x_s - x_h}{r_{sh}} - \frac{x_s - x_g}{r_{gs}} \end{bmatrix}$$

The partial with respect to the Shuttle's velocity:

$$\frac{\partial \rho_r}{\partial \dot{x}_v} = 0_{1 \times 3}$$

The partial with respect to the Shuttle's bias:

$$\frac{\partial \rho_r}{\partial \dot{x}_b} = 0$$

The partial with respect to Hubble's position:

$$\frac{\partial \rho_r}{\partial x_h} = -\frac{x_s - x_h}{\sqrt{(x_s - x_h)^2 + (y_s - y_h)^2 + (z_s - z_h)^2}} + \frac{x_h - x_g}{\sqrt{(x_h - x_g)^2 + (y_h - y_g)^2 + (z_h - z_g)^2}}$$

Now substituting in the range definitions, and taking partials of HST's y and z components we arrive at the H vector:

$$\frac{\partial \rho_r}{\partial x_h} = \begin{bmatrix} -\frac{x_s - x_h}{r_{sh}} + \frac{x_h - x_g}{r_{hg}} \\ \frac{y_s - y_h}{r_{sh}} + \frac{y_h - y_g}{r_{hg}} \\ \frac{z_s - z_h}{r_{sh}} + \frac{z_h - z_g}{r_{hg}} \end{bmatrix}$$

The partial with respect to Hubble's velocity:

$$\frac{\partial \dot{r}_h}{\partial \rho_r} = 0_{1 \times 3}$$

Now forming a H vector for the direct measurement $$H_{\rho r}(x) = \begin{bmatrix} \frac{\partial \rho}{\partial X_{s1 \times 3}} & 0_{1 \times 3} & \frac{\partial \rho}{\partial X_{h1 \times 3}} & 0_{1 \times 3} & 0 \end{bmatrix}$$

The equation that relates the Pseudorange rate measurement to the states is given by:

$$h(x) = \dot{\rho} = (V_u - V_g) \cdot \frac{X_s - X_g}{|X_s - X_g|}$$

The measurement is simply the relative velocity along the line of sight vector between the GPS transmitter and the Shuttle.

$$H_{\dot{p}}(x) = \frac{\partial \dot{p}}{\partial X}$$

This partials with respect to the scalar x position is given as:

$$\frac{\partial \dot{p}}{\partial x_s} = (V_s - V_g)x \left[ \frac{\frac{1}{\sqrt{(x_s-x_h)^2+(y_s-y_h)^2+(z_s-z_h)^2}} -}{\frac{(x_s-x_g)^2}{\left(\sqrt{(x_s-x_h)^2+(y_s-y_h)^2+(z_s-z_h)^2}\right)^3}} \right]$$

Now substituting in the range formulas to clean up $$\frac{\partial \dot{p}}{\partial x_s} = (V_s - V_g)_x \left[ \frac{1}{r_{sh}} - \frac{(x_s-x_g)^2}{r_{sh}^3} \right]$$

The same holds for the y and z vectors as well.

$$\frac{\partial \dot{p}}{\partial y_s} = (V_s - V_g)_y \left[ \frac{1}{r_{sh}} - \frac{(y_s-r_g)^2}{r_{sh}^3} \right]$$

$$\frac{\partial \dot{p}}{\partial z_s} = (V_s - V_g)_z \left[ \frac{1}{r_{sh}} - \frac{(z_s-z_g)^2}{r_{sh}^3} \right]$$

Now taking the partials with respect to range, it simply leaves the line of sight vectors.

$$\frac{\partial \dot{p}}{\partial V_s} = \frac{X_s - X_h}{|X_s - X_h|}$$

breaking these into components and substituting in the range equation, we get:

$$\frac{\partial \dot{p}}{\partial V_{sx}} = \frac{x_s - x_h}{r_s h}$$

$$\frac{\partial \dot{p}}{\partial V_{sy}} = \frac{y_s - y_h}{r_s h}$$

$$\frac{\partial \dot{p}}{\partial V_{sz}} = \frac{z_s - z_h}{r_s h}$$

Assuming a constant receiver bias:

$$\frac{\partial \dot{p}}{\partial X_b} = 0$$

Because there is no information contained in the pseudorange rate about the state vector of the Hubble, the partials with respect to Hubble's states are 0.

$$\frac{\partial \dot{p}}{\partial X_h} = 0_{1\times3}$$

$$\frac{\partial \dot{p}}{\partial V_h} = 0_{1\times3}$$

Now constructing the H vector for the psuedorange rate measurement, we get:

$$H_{\dot{p}}(X) = \left[ \frac{\partial \dot{p}}{\partial X_s}_{1\times3} \quad \frac{\partial \dot{p}}{\partial V_s}_{1\times3} \quad 0_{1\times3} \quad 0_{1\times3} \quad 0 \right]$$

The reflected pseudorange measurement is essentially the sum of the Doppler shift along the paths of the signal. This is given by:

$$h(X) = \dot{\rho} = (V_s - V_h)\cdot\hat{los}_{sh} + (V_h - V_g)\cdot\hat{los}_{hg}$$

Now, expressing the line of sight vectors in terms of their components:

$$h(X) = \dot{p}_{rm} = (V_s - V_h)\cdot\frac{X_s - X_h}{|X_s - X_h|} + (V_h - V_g)\cdot\frac{X_h - X_h}{|X_h - X_g|}$$

From this, we need to take the partials with respect to the state vector components. For the shuttle position states, in the x direction:

$$\frac{\partial \dot{p}}{\partial x_s} = (V_s - V_h)_x \left[ \frac{1}{|X_s - X_h|} - \frac{(x_s-x_h)^2}{|X_s - X_h|^3} \right]$$

Substituting in the range vectors to simplify the equation we get $$\frac{\partial \dot{p}}{\partial x_s} = (V_s - V_h)_x \left[ \frac{1}{r_{sh}} - \frac{(x_s-x_h)^2}{r_{hs}^3} \right].$$

For the shuttle position states, in the y and z directions:

$$\frac{\partial \dot{p}}{\partial y_s} = (V_s - V_h)_y \left[ \frac{1}{r_{sh}} - \frac{(y_s-y_h)^2}{r_{hs}^3} \right]$$

$$\frac{\partial \dot{p}}{\partial z_s} = (V_s - V_h)_z \left[ \frac{1}{r_{sh}} - \frac{(z_s-z_h)^2}{r_{hs}^3} \right]$$

Now taking the partial with respect to the Shuttle's velocity:

$$\frac{\partial \dot{p}}{\partial V_s} = \frac{X_s - X_h}{|X_s - X_h|}$$

This simply leaves the line of sight vector to the Hubble; expanding this into the x,y, and z components:

$$\frac{\partial \dot{\rho}}{\partial V_{sx}} = \frac{x_s - x_h}{r_{sh}}$$

$$\frac{\partial \dot{\rho}}{\partial V_{sy}} = \frac{y_s - y_h}{r_{sh}}$$

$$\frac{\partial \dot{\rho}}{\partial V_{sz}} = \frac{z_s - z_h}{r_{sh}}$$

$$\frac{\partial \dot{\rho}}{\partial X_{hx}} = -(V_s - V_h)_x \cdot \left[\frac{1}{|X_s - X_h|} - \frac{(x_s - x_h)^2}{|X_s - X_h|^3}\right] + (V_h - V_g) \cdot \left[\frac{1}{|X_h - X_g|} - \frac{(x_h - x_g)^2}{|X_h - X_g|^3}\right]$$

substituting in the range vectors to clean up the equation, and extrapolating to the y,z vectors we arrive at:

$$\frac{\partial \dot{\rho}}{\partial X_{hx}} = -(V_s - V_h)_x \cdot \left[\frac{1}{r_{sh}} - \frac{(x_s - x_h)^2}{r_{sh}^3}\right] + (V_h - V_g)_x \cdot \left[\frac{1}{r_{hg}} - \frac{(x_h - x_g)^2}{r_{hg}^3}\right]$$

$$\frac{\partial \dot{\rho}}{\partial X_{hy}} = -(V_s - V_h)_y \cdot \left[\frac{1}{r_{sh}} - \frac{(y_s - y_h)^2}{r_{sh}^3}\right] + (V_h - V_g)_y \cdot \left[\frac{1}{r_{hg}} - \frac{(y_h - y_g)^2}{r_{hg}^3}\right]$$

$$\frac{\partial \dot{\rho}}{\partial X_{hy}} = -(V_s - V_h)_z \cdot \left[\frac{1}{r_{sh}} - \frac{(z_s - z_h)^2}{r_{sh}^3}\right] + (V_h - V_g)_z \cdot \left[\frac{1}{r_{hg}} - \frac{(z_h - z_g)^2}{r_{hg}^3}\right]$$

Now taking the partial with respect to the Hubble's velocity, we simply get a relation involving the line of sight vectors.

$$\frac{\partial \dot{\rho}}{\partial V_h} = -\frac{X_s - X_h}{|X_s - X_h|} + \frac{X_h - X_g}{|X_h - X_g|}$$

expanding it into the x,y,z components and substituting in the range definitions we get:

$$\frac{\partial \dot{\rho}}{\partial V_{hx}} = -\frac{x_s - x_h}{r_{sh}} + \frac{x_h - x_g}{r_{hg}}$$

$$\frac{\partial \dot{\rho}}{\partial V_{hy}} = -\frac{y_s - y_h}{r_{sh}} + \frac{y_h - y_g}{r_{hg}}$$

$$\frac{\partial \dot{\rho}}{\partial V_{hz}} = -\frac{z_s - z_h}{r_{sh}} + \frac{z_h - z_g}{r_{hg}}$$

Since the reflected pseudorange rate does not involve the bias, it is zero.

$$\frac{\partial \dot{\rho}}{\partial X_b} = 0$$

Forming the linearized measurement vector we get:

$$H_{\dot{\rho}r}(X) = \begin{bmatrix} \frac{\partial \dot{\rho}r}{\partial X_{s1x3}} & \frac{\partial \dot{\rho}r}{\partial V_{s1x3}} & \frac{\partial \dot{\rho}r}{\partial X_{h1x3}} & \frac{\partial \dot{\rho}r}{\partial V_{h1x3}} & 0 \end{bmatrix}$$

The measurement matrix corrects the Kalman Filter's dynamic estimates with the current measurement estimates. The measurement matrix is stacked up in the same order as the measurements.

The measurement for the relative filter is given by:

$$H = [H_{\rho r}(X), H_{\dot{\rho} r}(X)]^T$$

The matrix for the Absolute dynamic filter is given as:

$$H = [H_{\rho}(X), H_{\dot{\rho}}(X), H_{\rho r}(X), H_{\dot{\rho} r}(X)]^T$$

The process noise matrix, Q describes the covariance error associated with the model. It generally describes the model errors and un-modeled force inputs. In our case, since Q is difficult to obtain, it is treated as a tuning matrix, to adjust the performance of the filter.

$$Q = \begin{bmatrix} \sigma_p^2 I_{3x3} & 0_{3x3} \\ 0_{3x3} & \sigma_v^2 I_{3x3} \end{bmatrix}$$

$\sigma_p$ is the standard deviation in Hill's relative position model, $\sigma_v$ is the standard deviation in Hill's relative velocity model.

$$Q = \begin{bmatrix} \sigma_{ps}^2 I_{3x3} & 0 & 0 & 0 & 0 \\ 0 & \sigma_{vs}^2 I_{3x3} & 0 & 0 & 0 \\ 0 & 0 & \sigma_{ph}^2 I_{3x3} & 0 & 0 \\ 0 & 0 & 0 & \sigma_{vh}^2 I_{3x3} & 0 \\ 0 & 0 & 0 & 0 & \sigma_b^2 \end{bmatrix}$$

$\sigma_{ps}$ is the standard deviation in the Shuttle's position model, $\sigma_{vs}$ is the standard deviation in the Shuttle's velocity model. $\sigma_{ph}$ and $\sigma_{vh}$ represent the standard deviation in Hubble's position and velocity models respectively.

The R matrix represents the variance in the measurements. Ideally the variance is uncorrelated white gaussian noise. Since we can estimate the variance of the measurements with relative accuracy, this matrix is essentially fixed.

$$R = \begin{bmatrix} \sigma_{\rho r}^2 I_{mxm} & 0_{mxm} \\ 0_{mxm} & \sigma_{\dot{\rho} r}^2 I_{mxm} \end{bmatrix}$$

$\sigma_{D\rho}$ and $\sigma_{D\dot{\rho}}$ are the differenced psuedorange and reflected pseudorange rate measurements.

$$R = \begin{bmatrix} \sigma_{\rho}^2 I_{nxn} & 0 & 0 & 0 \\ 0 & \sigma_{\dot{\rho}}^2 I_{nxn} & 0 & 0 \\ 0 & 0 & \sigma_{\rho r}^2 I_{mxm} & 0 \\ 0 & 0 & 0 & \sigma_{\dot{\rho} r}^2 I_{nxn} \end{bmatrix}$$

$\sigma_\rho$ is the standard deviation in the pseudorange measurement, $\sigma_{\dot{\rho}}$ is the standard deviation in the pseudorange rate measurement. $\sigma_{D\rho}$ and $\sigma_{D\dot{\rho}}$ are the differenced psuedorange and reflected pseudorange rate measurements.

Implementation of a preferred embodiment will now be described.

The use of reflected GPS signals as a navigational tool may be particularly useful when navigating toward an orbiting target such as the Hubble Space Telescope (HST) in order to perform repairs, replace critical parts or otherwise service an orbiting device. The ability to passively and autonomously navigate to perform servicing missions could lead to unmanned service missions as well as reduced weight and power consumption. The following description relates to navigating the space shuttle to the HST.

The space shuttle will incorporate a GPS receiver such as that disclosed and describe in US 2006-0082496 to Winternitz et al. which is incorporated herein in its entirely. The '496 receiver is particularly suited for implementing the method of the present invention using reflected GPS signals by having the ability to acquire and track weak GPS signals. The navigation system will include two antennas; a Right Handed and Left Handed Circular Polarized (LHCP, RHCP) antennas. The GPS receiver will be powered on as it approaches the HST within 1000 m from Hubble. The Shuttle's position can be estimated with conventional methods of navigation using direct GPS signals and a dynamic orbit model. The receiver onboard the Space Shuttle will be acquiring the direct signals as it approaches the HST which will be received by the RHCP GPS antenna. A convenient feature about a RHCP signal is that, when reflected off of a surface such as the HST, it reverses polarization and becomes left hand circularly polarized. This gives it a nearly perfect rejection for a reflected signal. Therefore, the LHCP Antenna is well suited to pick up the reflected signals.

Both of the antennae will receive the raw RF stream mixed down to IF, 35.42 MHz, and then sampled at 8.192 MS/s. This data will be processed as previously described to compare the direct and reflected signals to estimate the position of the Shuttle relative to the HST.

The use of ever increasing speeds of computers, microprocessor and FPGAs, complex signal processing algorithms will be used to apply the aforementioned filtering techniques and signal acquisition methods to determine the structure and composition of the reflected signals.

The GPS receiver used to record and process the data is the Navigator GPS. The GPS receiver is running at 65.536 MHz using a General Dynamics Coldfire processor and has three application specific Actel AX2000 FPGA's. The enhanced capabilities of this receiver are aided by the application specific FPGAs that implement an algorithm developed to acquire weak signals in real time as disclosed '496 to Winternitz et al. This algorithm is an FFT based acquisition algorithm that operates in the frequency domain. It is able to acquire and track signals down to 25 dB-Hz. This is approximately 10 dB more sensitive than current off the shelf GPS receivers. This will enable the Navigator to acquire the weaker reflected signals off of the HST.

The Navigator receiver will be configured to track 24 channels, 12 of them connected to the LHCP antenna and the remaining 12 connected to the RHCP antenna. While tracking a direct signal, the reflected channels will be directed to search in a time delayed space with approximately the same Doppler frequency. This will tremendously aid acquisition of the weaker reflected signals.

The aforementioned extended Kalman filter will run on the navigation processor taking in the RHCP and LHCP measurements. Thus the Navigation system will be able to estimate the position of the Shuttle in orbit and the relative position of the HST by comparing the directed and reflected signals of a plurality of GPS satellites as previously discussed. Using a receiver to receive both direct and reflected GPS signals and comparing/processing the embedded ranging data (time delay etc.), coupled with the dynamic model in the extended Kalman filter, the navigation system of the present invention can passively and autonomously track a relative position of an orbiting spacecraft (Shuttle) to an orbiting target (HST). The ability to passively and autonomously passively navigate a space craft toward a target not only reduces weight and power consumption, but also paves the way for potential precise passive navigation of space craft for unmanned service missions.

A simulation and implementation of the method of the present invention will now be discussed in regards to a Shuttle mission approaching the Hubble Telescope.

The Hubble Rendezvous truth-scenarios are chosen such that the initial conditions will result in a near collision of the Shuttle and Hubble. The truth model is generated with STK using a high fidelity orbit propagator.

The Space Shuttle may approach Hubble from the aft end with its bay doors pointed towards Hubble. This allows the Shuttle to dock cleanly with Hubble.

During the servicing mission, the left and right handed GPS Antennae will be placed on the MULE inside the bay of the shuttle looking outwards.

The model focuses on simulating the uncontrolled motion of the two bodies. In order to represent the "docking", initial conditions were chosen such that the two space craft come within close proximity to each other.

The model was created using STK, given a set of initial conditions, and propagated over an orbit period. The STK model chosen was a 21-order gravity model with atmospheric drag on both the Shuttle and Hubble, the coefficients of drag chosen as to represent the relative mass and area ratios.

| | | | Units |
|---|---|---|---|
| Shuttle | ECI Position | $(-4673.7, -4525.4, 2443.5)^\tau$ | Km |
| | ECI Velocity | $(5.604, -4.472, 2.438)^\tau$ | Km/s |
| | Mass | 109,000 | kg |
| | Area | 58.4 | m$^2$ |
| | $C_d$ | 1.2 | |
| Hubble | ECI Position | $(-4673.9, -4525.9, 2443.7)^\tau$ | Km |
| | ECI Velocity | $(-5.604, -4.471, 2.437)^\tau$ | Km/s |
| | Mass | 11,110 | kg |
| | Area | 15.4 | m$^2$ |
| | $C_d$ | 0.8 | |

The area for the Shuttle was approximated using the circular cross sectional area of the Shuttle. The same was done for the Hubble.

The visibility of each GPS satellite is determined by the geometry of the GPS constellation with respect to the location of Hubble and the Shuttle. The satellite visibility is essential to determining how many measurements both direct and reflected are available. This number of measurements available influences the absolute and relative position accuracies.

The GPS constellation is constructed and propagated using the keplerian elements given by an almanac file. The almanac file is generated and uploaded to each GPS satellite. It represents a limited set of the keplerian orbits, in order to provide a rough position estimate of the all of GPS satellites. These orbits are then propagated in time, providing a good estimate of the satellites orbits. This is purely used to generate a moving rough estimate of the GPS constellation for the simulation.

In practice the GPS constellation is closely monitored, and each satellite has a new ephemeris updated every 3 hours. In addition to updating their GPS Almanac files every 12 hours.

The Almanac parameters are given by:

| Parameter | Symbol | Scaling |
|---|---|---|
| Time of Almanac | toa | secs |
| Eccentric Anamoly | E | none |
| Inclination | i0 | semicircles + 0.94247 |
| Rate of Right Ascention | $\dot{\Omega}$ | semicircles |
| Semi-major axis | A½ | none |
| longitude of perigee | $\lambda$ | semicircles |
| Argument of Perigee | $\omega$ | semicircles |
| Mean Anamoly | M | semicircles |

Since we are only interested in observing those GPS Satellites with a reflected pair, and since the relative distance is so small, we can assume that any GPS satellite seen by the space Shuttle can also be seen by the Hubble.

Figure 4:
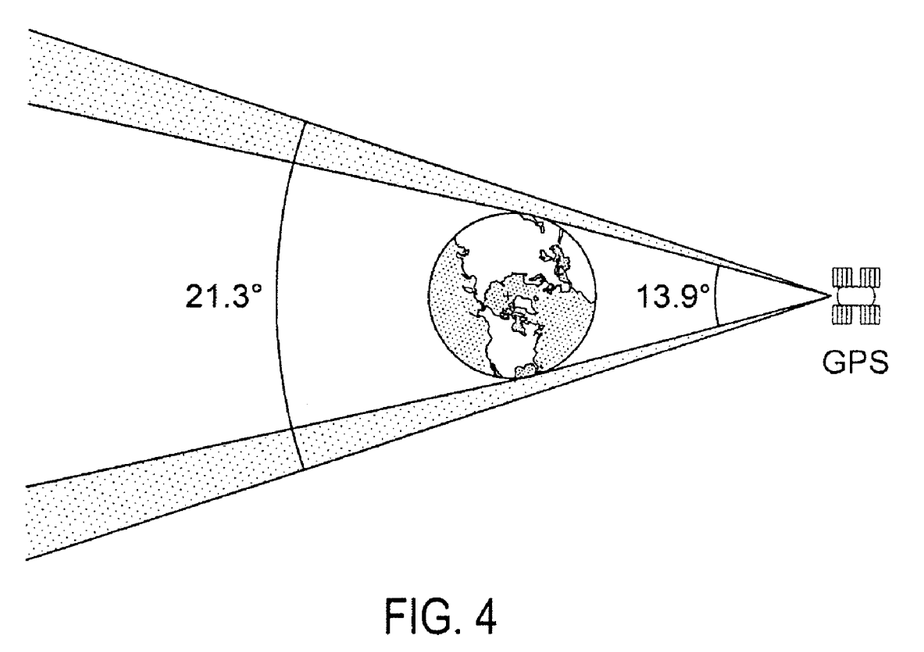
FIG. 4 is a diagram depicting the visibility of GPS signals to a body in orbit.
Figure 5:
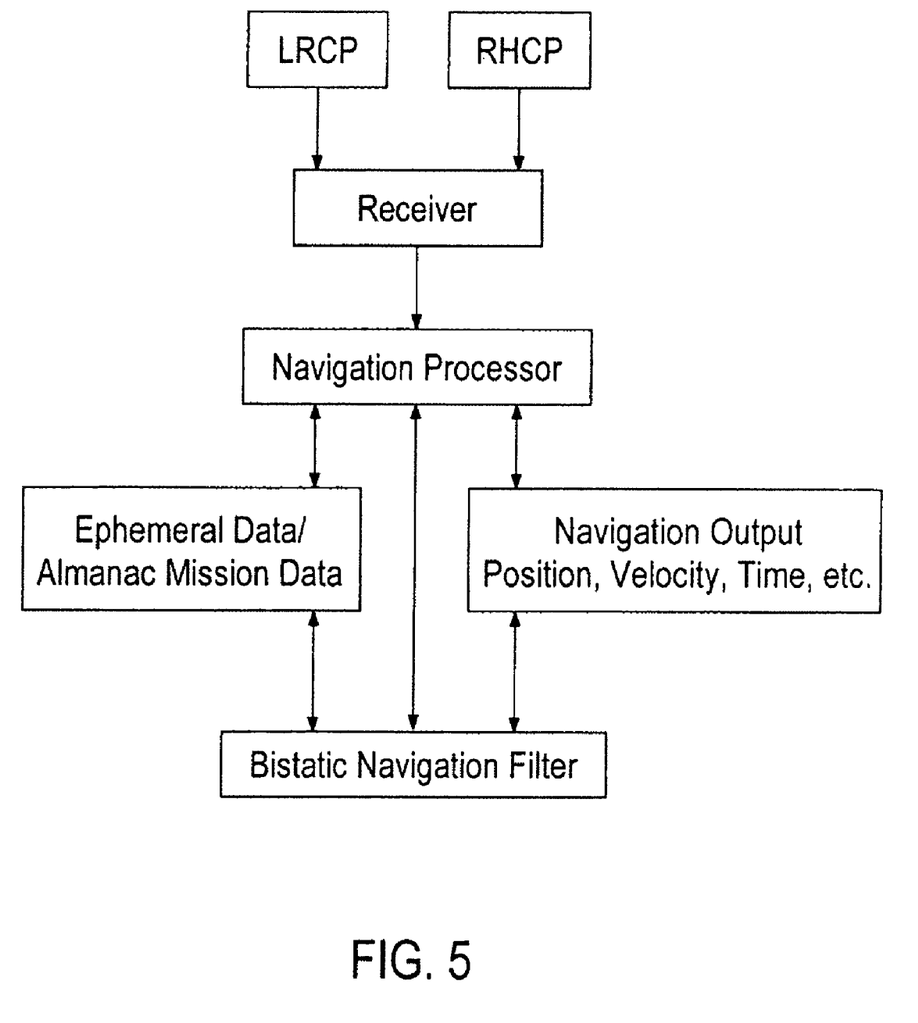
FIG. 5 is a block diagram of a system to receive and process reflected signals according to a preferred embodiment of the present invention.
Figure 6:
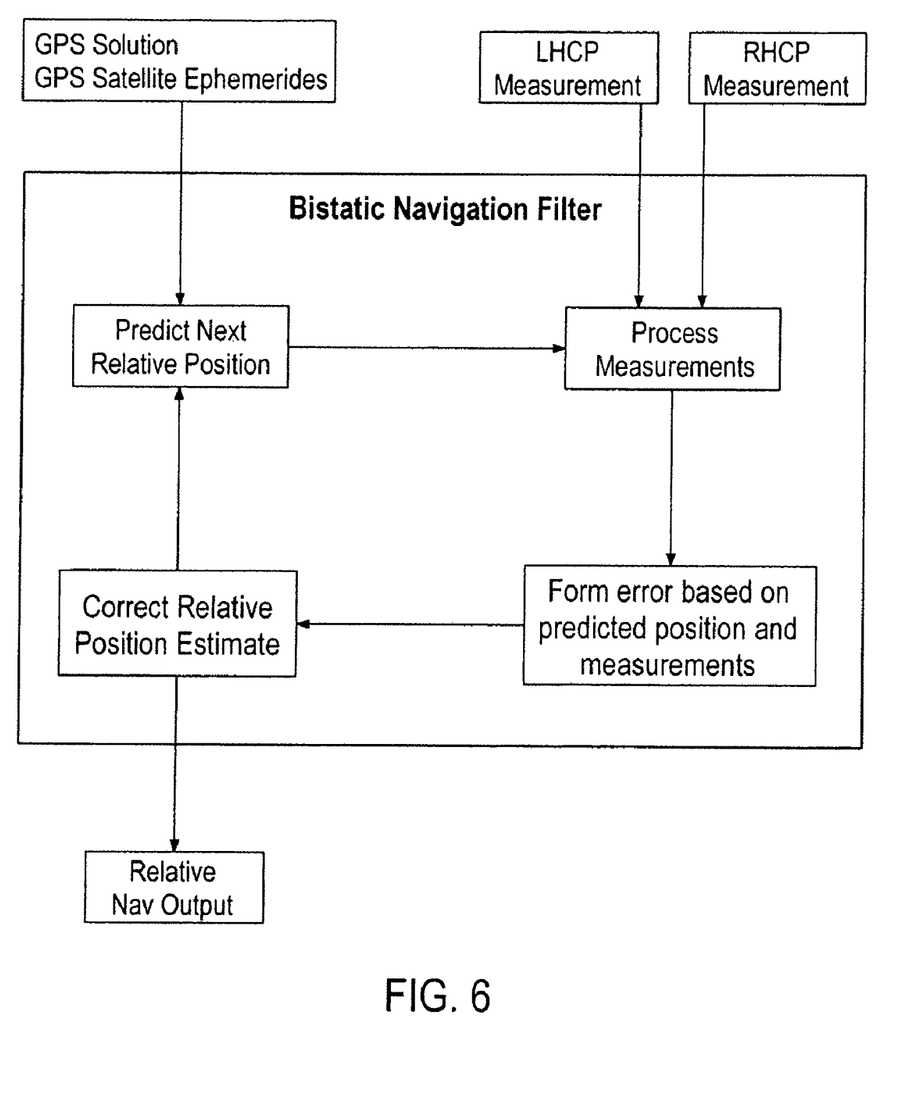
FIG. 6 is a flow diagram depicting the algorithm to receive and process reflected signals according to a preferred embodiment of the present invention.

The visible signals are done by masking out those GPS satellites whose main lobes cross through the earth, or are not in view of the shuttle. This is done by calculating the angle between the line of sight vector, and position vector of the shuttle as seen in FIG. 4. If β is greater than 13.9° and less than 21.3° then it is within the main lobe and just over the lim of the earth. If β is less than 13.9°, then we need to check to make sure the signal does not pass through the earth. Thus, the dot product of the two vectors should be negative.

The bi-static radar equation described in is given as:

$$(R_T R_R) = \left( \frac{P_T G_T G_R \lambda^2 \sigma_B F_T^2 F_R^2}{(4\pi)^2 K T_S B_N (S/N)_{min} L_T L_R} \right)^{1/2}$$

| | |
|---|---|
| $R_T$ | Transmitter to target range |
| $R_R$ | Target to receiver range |
| $P_T$ | Transmitter power |
| $G_T$ | Transmit antenna power gain |
| $G_R$ | Receive antenna power gain |
| $\sigma_b$ | Bistatic radar cross section |
| $F_T$ | Pattern propagation factor for transmit to target |
| $F_R$ | Pattern propagation factor for receiver to target |
| K | Boltzman's constant |
| $T_n$ | Receiver noise temperature |
| $D_n$ | Noise bandwidth of the receivers pre-detection filter |
| (S/N) | signal-to-noise ratio required for detection |
| $L_T$ | Transmit system losses |
| $L_R$ | Receive system losses |

This equation is used to determine the maximum range to the target. However, rearranging terms, it is possible to pose this in the form of SNR received.

There are several universal constants from this particular implementation. $\lambda$ is the wavelength of the GPS L1 signal. The GPS L1 signal is transmitted at 1575.42 MHz, giving it a wavelength of 0.1903 m. Boltzmann's constant is given by $1.3806503 \times 10^{-23}$ J/K. $F_T$ and $F_R$ are the pattern propagation factors, these factors describe the loss due to transmission in an unclean environment. $F_T$ and $F_R$ can be estimated at around 2 dB total for the ionospheric effects.

The bi-static radar cross section is calculated in much the same way as the standard radar cross section. However, the transmit angle needs to be taken into account, as well as properties limited only to the bi-static scenario.

Since the Hubble can be approximated as a cylinder and the approach profile is towards the aft-end. The Hubble can approximated by the reflective properties of a circular flat plate combined with a cylindrical surface normal to the flat plate. In physical optics, the equation describing the RCS for a metallic circular disk is:

$$\sigma = 16\pi \left| \frac{A\cos\theta}{\lambda} \cdot \frac{J_1(kd\sin\theta)}{kd\sin\theta} \right|^2$$

Where A is given as the physical area of the disk, d is the diameter, and $J_1(x)$ is the Bessel function of the first kind of order one. $\lambda$ is the wavelength.

The Hubble space telescope has a diameter of roughly 4.2 m. Thus giving an area of roughly 13.85 m².

For normal incidence, this equation simplifies to:

$$\sigma = \frac{4\pi A^2}{\lambda^2}$$

This would represent the monostatic cross sectional area of the Hubble space telescope with the observer looking perpendicular to the aft end. Thus, the maximum possible cross-sectional area, looking at the aft end is 36.81 dB-sqm. It is interesting to note that the GPS signal will get gain from the reflections. If the observer was oriented perpendicular to Hubble, it would appear as a cylinder to the viewer. In this case, the RCS is given by:

$$\sigma = kal^2 \left| \frac{\sin(kl\sin(theta))}{kl\sin(theta)} \right|^2$$

Where a=2.1 m is the radius, l=14.2 m is the length of the Hubble, k is the wave number, and $\lambda$ is the wavelength. This provides a predictable radar cross section. With the assumption since at the extremes of both of these figures, the RCS drops off significantly, and effectively take the maximum RCS. Of the two plots, the side of the cylinder offset by 90° to form a combined RCS model for the cylinder over 180°. Since a cylinder is symmetrical, this is effectively models the full cylinder over 360°.

In order to account for the bi-static nature of the problem, it is necessary to define a new angle called the bi-static angle. This angle is defined as the difference between the receive and transmit antennae, $\beta=\theta_r-\theta_t$, the bisection of this angle is used to approximate the Bi-static RCS, $\sigma_b$. The bi-static RCS can be grouped into 3 sections: the pseudo-monostatic RCS region, the forward scatter RCS region, and the bi-static RCS region. In the pseudo-monostatic region, the Crispin and Seigal monostatic-bi-static equivalence theorem predicts that for a sufficiently small angle, the RCS is equivalent to the monostatic RCS measured the bisector of the bistatic angle. This theorem applies to a sufficiently smooth surface, such as a sphere, a cylinder, or cone. Some empirical data for a cylinder, performed at 35 GHz, the pseudo-monostatic region extends to roughly 20°, while the bistatic is within $20° \leq \beta \leq 140°$ and forward scatter at β>140 °.

The bi-static region begins where the pseudo-monostatic region ends, it is where the theorem fails to predict an accurate RCS. Unfortunately, there is no empirical formula for this equation. Experimental data shows a downward trend, from −2 dB to −15 dB, in this case. It should suffice to use a linear approximation (in dB).

The third bi-static region is the forward scattered region, this occurs when the bi-static angle approaches $180°o$. The forward scatter can be approximated by treating the shadow area as a uniformly illuminated antenna aperture. The roll off can be approximated when Π-β is substituted for the angle off aperture normal. This function closely matches $J_0(x)/x$ where $J_0(x)$ is the Bessel function of order 0. In our situation, many of the GPS satellites will lie in this area, due to being below the constellation. This is to our benefit, allowing us to pick up signals, being at such an odd orientation. Luckily due to the change in polarization of the reflected signal, this will provide us with isolation from the direct signal from the satellite.

From these bi-static regions we can now form a full approximation for the bi-static radar coefficient. The plot below represents $\sigma_b$ with the flat face of the cylinder oriented towards the receiver. This should provide a reasonable fit for a perfectly reflecting disk.

The antennae chosen for this mission are two hemispherical antennas. The antenna gain is given as 3 dBic. Built into each antenna is the low noise amplifier. The LNA has a gain of 26 dB with a noise figure of 2.8. This can be used to calculate the system noise temperature. This equation is given as:

$$T_s = 10 \log(T_A(NF-1))$$

Where, $T_A$ is the temperature at the antenna. Since the LNA is at the antenna, the line losses are included in the analysis. From the spec sheet, the NF of the antenna is given as 2.8 dB. A conservative approximation for this noise figure is to use the temperature at the antenna, $T_A$, as room temperature or 290 K. This approximation holds because the antennae are lying on the MULE. The MULE will be heated in order to keep the electronics from freezing. From this equation we find that the receiver noise temperature is 24.4 dB-K.

The $L_R$ and $L_T$ and receiver and transmit system losses respectively will be taken into account as a total system loss. A general approximation of loss in a communications system is about 2 dB. Usually this value is measured quantitatively, but, without a complete system to test, it is difficult to arrive at a true figure. The noise bandwidth, $B_n$ is generally taken as 1/T, where T is the pre-integration period. For Navigator, it has an adjustable preintegration period, however the nominal case is 1 ms. Other losses occur such as Polarization mismatch contributing 3 dB and in the case of a reflection, there is an efficiency which is dependent on the reflectivity of the object. In the case of the Hubble, which is coated in mylar, it will have a high reflectivity coefficient, this is typically 90-98%, depending on the quality.

The range calculations $R_R$ is simply the geometric distance between the Shuttle and the Hubble, while $R_T$ is simply the geometric distance between each GPS Satellite and the Hubble. Factoring the free space loss due to range the equations:

$$R_T(dB) = 20\log\left(\frac{4\pi R_T}{\lambda}\right)$$

$$R_R(dB) = 20\log\left(\frac{4\pi R_R}{\lambda}\right)$$

At each time-step, for each visible GPS satellite, each range value is calculated. With the assumption that the Shuttle is oriented with its bay doors towards the aft bulkhead of Hubble, it is possible to estimate the angle β and which surface of the cylinder the reflection is striking. The truth positions were generated from a file that is the simple 2-body relative motion, coupled with some thruster firing for a realistic closing profile. This produces an expected satellite visibility given the aforementioned conditions. It should be noted that the model does not take into account the reflections from the solar panels and assumes an orientation with the antennae directly facing the aft bulkhead.

The direct signal is generated using the truth positions of the Shuttle and Hubble. A receiver bias is added on top of the signal, as well as the ionospheric error given by the equation $$\delta_{iono} = \frac{82.1 TEC}{F_c^2 \sqrt{\sin^2(EL) + 0.76} + \sin^2(EL)}$$

TEC is the total electron content, given by 2e17. $F_c$ is the carrier frequency 1.57542 GHz, and EL is the elevation of the GPS satellite over the horizon.

The direct signal pseudorange rate is generated by the rate of change of the line of sight vectors. In practice, most GPS receivers rely only on the pseudorange measurements or use carrier phase to generate the velocities. The pseudorange rate measurements are generally noisy and actually degrade the performance of the filter.

A variance of 5 meters was chosen for the direct pseudoranges, and 25 cm/s for the pseudo-range rates. It is composed of the clock drift, ephemeris errors, phase noise, and other unmodeled sources. The ionospheric bias was neglected in this simulation, as it would have been differenced out in the measurement generation. The pseudo-range variance may be increased by a nominal amount, 0.25 m, to reflect the ionospheric model discrepancies.

The differenced reflected measurements were constructed from the total path lengths between the GPS Satellite, Hubble, and the Shuttle. The noise added is from the loss in signal quality due to the reflective properties and small ionospheric error. Since the measurement is a differenced reflected signal with that of the direct path, the bias and the ionospheric terms become small and are negligible. In addition to the ionospheric error practically canceling out, the front end bias, clock bias, thermal jitter and other common mode errors also disappear.

A variance of 25 meters was chosen for the reflected pseudo-ranges, and 50 cm/s for pseudo-range rates. Although the true variance is unknown, it is extremely difficult to model on the earth. Future tests will include an anechoic chamber testing or data reduction of the rendezvous experiment.

While the method and apparatus of the present invention has yet to be tested oil a service mission, simulations have proven the viability and utility of the use of comparing reflected and directly received GPS signals to passively navigate spacecraft to an orbiting target. The present invention is currently scheduled to fly in August 2008 on Hubble Servicing Mission 4. A further discussion of such simulations can be found in Ian Cohen's thesis entitled "Relative Navigation for Hubble Mission Using Reflected GPS signals", published by the University of Maryland in May 2007 and is hereby incorporated herein by reference in its entirety.

One additional use of the method of using reflected GPS signals as a passive navigation system is to compliment existing navigation tools. This passive system can not only provide an extra measurement tool offering additional redundancy, it could also be used to navigate a space craft to within sufficient proximity of an orbiting target reducing the amount of time active systems such as LIDAR and RADAR are powered. Because this method and system of the present invention may be employed by simply adding the second LHCP antenna and loading the algorithmic complexity onto existing systems, redundancy and reduced power consumption can be achieved with little modifications to existing equipment.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

The invention claimed is:

1. A method of passively navigating an orbiting spacecraft towards an orbiting target, said method comprising the steps of:
   receiving a plurality of direct signals, each of said plurality of direct signals transmitted from a corresponding one of a plurality of celestial GPS earth orbiting satellites transmitting ranging data signals;
   receiving a reflected signal from said corresponding one of said plurality of GPS satellites reflected off said orbiting target;
   comparing said direct signals and said reflected signals; and
   determining a position of said orbiting spacecraft relative to said orbiting target based on said step of comparing said direct signals and said reflected signals.

2. The method of claims 1, wherein said step of comparing said direct and reflected signals includes the step of determining a time delay between receiving said direct signal and receiving said reflected signal from a particular GPS satellite.

3. The method according to claim 1 wherein said steps of receiving said direct and reflected and said step of comparing said direct signals and said reflected signals are autonomously and passively performed on said orbiting space craft.

4. The method of claim 1, step of determining a relative position of said orbiting spacecraft includes tracking the position of the spacecraft and updating the position of the spacecraft as a function of the tracked position and said ranging data.

5. The method of claim 4, wherein step of determining said relative position of said orbiting spacecraft includes filtering said ranging data in said reflected signals and said direct signals.

6. The method of claim 5, wherein step of determining said relative position of said space craft includes employing an extended Kalman filter to compute the position of the orbiting spacecraft relative to said orbiting target.

7. The method according to claim 1, wherein said step of receiving said direct signals is performed with a left handed circular polarized antenna and said step of receiving said reflected signal is performed with a right handed circular polarized antenna.

8. The method according to claim 1, wherein said step of comparing said direct and reflected signals includes processing said signals into pseudorange measurements.

9. The method of claim 8, wherein said step of processing includes processing said direct signal into a pseudorange measurement representing a distance directly between said orbiting space craft and a corresponding satellite and processing said reflected signals into a pseudorange measurement representative of a sum distance between said orbiting space craft to said orbiting target and said orbiting target to said corresponding satellite.

10. The method of claim 3, further comprising a step of implementing a extended Kalman filter to process said ranging data to generate and update estimated position data thereby autonomously generate real time estimates of said relative position of said orbiting space craft relative to said orbiting target.

11. A navigation system to passively navigate an orbiting spacecraft to an orbiting target, said navigation system comprising:
   a receiver platform adapted to receive a plurality of signals carrying ranging data transmitted by at least one of a constellation of satellites; said receiving platform including;
      a first antenna adapted to receive at least one of said plurality of signals direct from a corresponding satellite;
      a second antenna adapted to receive said at least one of said plurality of signals from said corresponding satellite reflected off said orbiting target;
   a processor adapted to process said ranging data received by said first and second antennas to thereby autonomously and passively locate a relative position of said orbiting spacecraft relative to said orbiting target.

12. The navigation system according to claim 1 further comprising;
   an extended Kalman filter adapted to process said ranging data received by said receiver platform and generate and update estimated position data to autonomously generate estimates of said relative position of said orbiting space craft relative to said orbiting target.

13. The navigation system according to claim 1, wherein said processor is adapted to process said at least one of said plurality of signals direct from a corresponding satellite into a pseudorange measurement representing a distance directly between said orbiting space craft and said corresponding satellite and processing said at least one of said plurality of signals reflected of said orbiting target into a pseudorange measurement representative of a sum distance between said orbiting space craft to said orbiting target and said orbiting target to said corresponding satellite.

14. The passive navigation system according to claim 1, wherein said first antenna is a left handed circular polarized antenna and said second antenna is a right handed circular polarized antenna.

15. The passive navigation system according to claim 4, wherein each of said first and second antennas is a hemispherical antenna each incorporating a low noise amplifier.

16. The passive Navigation system according to claim 13, wherein said receiving platform receives signals transmitted from at least four satellites and said processor implements said extended Kalman filter to measure a relative position of said orbiting spacecraft relative to said orbiting target.

17. A method of passively navigating a moving body towards a moving target, said method comprising the steps of:
   receiving a plurality of direct signals, each of said plurality of direct signals transmitted from a corresponding one of a plurality of celestial GPS earth orbiting satellites transmitting ranging data signals;
   receiving a reflected signal from said corresponding one of said plurality of GPS satellites reflected off said moving target;
   implementing an extended Kalman filter to process said ranging data to generate and update estimated position data thereby autonomously generate real time estimates of said relative position of said moving space craft relative to said moving target;

comparing said direct signals and said reflected signals; and determining a position of said moving body relative to said moving target based on said step of comparing said direct signals and said reflected signals.

* * * * *